D. H. WILSON.
ELECTRIC WELDING SYSTEM.
APPLICATION FILED APR. 24, 1914.
1,187,405.
Patented June 13, 1916.
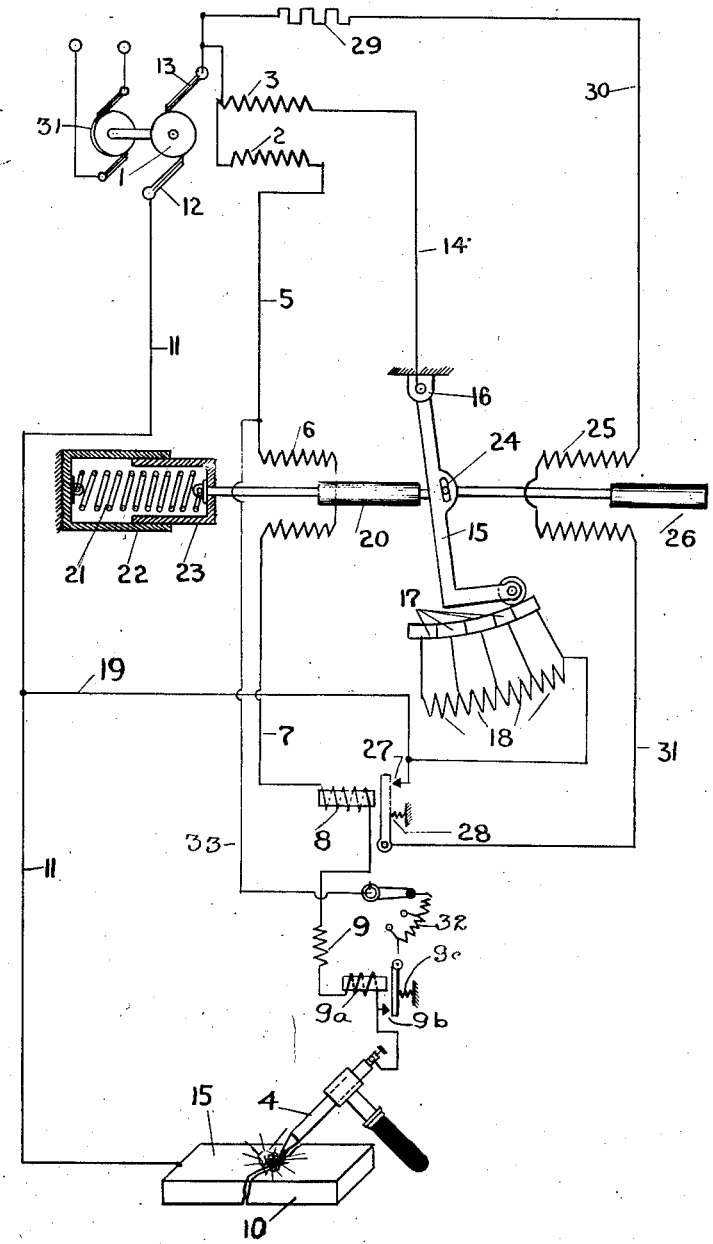
WITNESSES:
Basil Szabo
M. V. McAllister
INVENTOR.
David H. Wilson
BY Myron F. Hill
ATTORNEYS.

UNITED STATES PATENT OFFICE.

DAVID H. WILSON, OF PATERSON, NEW JERSEY.

ELECTRIC WELDING SYSTEM.

1,187,405.      Specification of Letters Patent.      Patented June 13, 1916.

Application filed April 24, 1914. Serial No. 834,071.

*To all whom it may concern:*

Be it known that I, DAVID H. WILSON, citizen of the United States, and resident of Paterson, in the county of Passaic and State of New Jersey, have invented certain new and useful Improvements in Electric Welding Systems, of which the following is a specification.

My invention comprises an electric welding system and has for its object a welding arc in which an even heating effect is maintained by means of a variation in the potential of the current to compensate for the variation in the resistance of the welding arc due to the unsteadiness of the operator's manual manipulation of the welding tool.

In the drawing the figure shows one form of apparatus by means of which my invention may be put into practice.

In the figure a source of current 1 is represented which preferably consists of a direct current generator operated by any suitable motor or engine. The generator 1 preferably contains a series field winding 2 and a shunt field winding 3. The field winding 2 is connected to the welding tool 4 over the following circuit: conductor 5, solenoid coil 6, conductor 7, circuit breaker coil 8, resistance 9, circuit closing coil 9ª and tool 4. The work, which may consist of a defective piece of metal or two portions of metal 10 adapted to be welded together, is connected through the conductor 11 to the brush 12 of the generator 1. The series coil 2 is connected upon this other side to the brush 13 of the generator.

After the operator has started the welding operation the unsteadiness of his hand creates a variation in the resistance of the welding arc between the tool 4 and the metal 10. Under ordinary circumstances this would result in a variation of the current and a variation of the heating effect of the arc with the result that the weld is porous. To overcome this defect, in welding I provide means to vary the potential of the current. This is accomplished by varying the resistance of the shunt field winding circuit of the generator 1 in exact proportion to the variation of the resistance of the welding arc. In accomplishing this result the shunt field winding 3 connected at one side with the brush 13 of the generator is connected through the following resistance circuit: conductor 14, switch arm 15 pivoted at 16 and adapted to make contact with any one of the series of contacts 17 connected to varied resistances 18 thence by conductor 19 and conductor 11 to the brush 12 of the generator. As the switch arm 15 sweeps over the contacts 17 various resistances 18 are introduced or cut out of the circuit of the shunt field coil thereby varying the amount of current which may pass through the coil. As an increased resistance is introduced into the circuit by the switch arm 15 a reduced amount of current flows through the shunt field coil 3 thereby reducing the potential of the current generated by the generator 1. As the resistance of this circuit is reduced by the switch arm 15 an increased amount of current flows through the shunt field coil 3 thereby increasing the potential of the current generated by the generator.

The resistance of the shunt field coil circuit is caused to vary by means of the solenoid 6 which acts upon the core 20. As the resistance of the welding arc increases the amount of current flowing through the solenoid 6 is reduced thereby reducing the pull upon the core 20. The compression spring 21 which may be located within the dash pot composed of the two portions 22 and 23 pushes the core 20 to the right in the figure causing the switch arm 15 which is operatively connected to the core by means of the pin and slot connection 24 to switch to the right thereby reducing the resistance at 18 and increasing the flow of current through the shunt field coil circuit heretofore described with the result heretofore noted. As the resistance of the welding arc is reduced a greater current flows through the circuit containing the solenoid 6 which has the effect of drawing the core 20 into the solenoid against the force of the compression spring 21 thereby causing the switch arm 15 to switch to the left in the figure over the contacts 17 thereby increasing the resistance of the shunt field coil circuit thereby reducing the current flowing through the winding 3 and thereby reducing the potential of the generator current delivered to the tool 4. In this way a welding arc is maintained at an even heat. The dash pot operatively connected with the switch arm 15 as shown prevents the switch arm from too great sensitiveness and too rapid oscillation.

Before the tool is first touched to the metal 10 it is apparent that no current flows through the solenoid coil 6. This would leave the core 20 and the switch arm 15, operatively connected thereto, under the sole influence of the compression spring 21 so that the switch arm 15 would introduce the lowest resistance into the shunt field coil circuit and thus create the highest potential at a period of time when through the contact of the tool 4 with the work 10, the resistance of the welding arc would be at its lowest point. This would cause a rush of current and a spatter of the welding metal. To prevent this defect a coil 25 is employed adapted to draw the core 26 into itself thereby causing the switch arm 15 to switch to the left hand extreme of the series of contacts 17 thereby introducing the maximum resistance of the automatic resistance varying device 15 into the circuit of the shunt field coil 3. This reduces the flow of the current of the coil 3 to its lowest point and the potential of the generator follows suit. When the tool 4 is touched to the work 10 the current flowing through the coil 8 opens a pair of contacts 27 held normally closed by the spring 28 and disrupts the circuit containing the solenoid coil 25 thereby releasing the core 26 so that it is left under the opposing influences of the solenoid coil 6 and the compression spring 21. The coil 25 is located in the following circuit; brush 13 resistance 29, conductor 30, coil 25, conductor 31, pair of contacts 27, conductor 19 conductor 11 and brush 12 of the generator. The resistance 29 is located in the circuit in order to reduce the amount of current flowing through the coil 25 to such a point as will not cause waste.

The rheostat 32 is employed to vary the resistance in circuit with the field coil 2 of the generator and to arbitrarily fix the amount of current to be delivered to the tool 4 in accordance with the various demands of the work. The rheostat 32 may be manipulated by the operator. The rheostat 32 is normally out of circuit. When the coil $9^a$ is energized it closes the contacts $9^b$ against the influence of the spring $9^c$ thereby introducing the rheostat in a branch or shunt circuit connected to the tool 4. The rheostat may be manipulated by hand to introduce any fixed resistance into the circuit to supply fixed additional amounts of welding current over the following circuit; brush 13, field coil 2, conductor 5, conductor 33, rheostat 32, pair of contacts $9^b$, tool 4. The solenoid 6 is so located and adjusted as to vary the current to just the extent necessary to compensate for the variation in resistance of the welding arc.

My apparatus herein described is particularly suitable for isolated welding outfits particularly for garages and the like and my generator may be driven by any suitable source of power 31 either electric motive power or an engine of any kind or by water or other power.

Many variations may be made in my invention without departing from its spirit.

What I claim is:

1. In a welding system, a source of current including a generator, a welding tool associated therewith and supplied with a welding current delivered from said source, and automatic means to vary the potential of said current in compensation for the variation in the resistance of the welding arc, consisting of an automatic resistance varying device in circuit with a field coil and adapted to vary the potential of said generator.

2. In a welding system, a source of current including a generator, a welding tool associated therewith and supplied with a welding current delivered from said source, and automatic means to vary the potential of said current in compensation for the variation in the resistance of the welding arc, consisting of an automatic resistance varying device in circuit with a shunt field coil and adapted to vary the potential of said generator.

3. In a welding system, a source of current including a generator, a welding tool associated therewith and supplied with a welding current delivered from said source, automatic means to vary the potential of said current in compensation for the variation in the resistance of the welding arc, consisting of an automatic resistance varying device in circuit with a shunt field coil and adapted to vary the potential to said generator, said welding tool being in circuit with a series field coil of said generator.

4. In a welding system, a compound generator having series and shunt field windings, a welding tool electrically associated with one of said windings, an automatic resistance varying device electrically associated with the other of said windings adapted to vary the potential of said generator, means subject to the electro-magnetic influence of the current flowing through the welding tool to vary said automatic resistance.

5. In a welding system, a compound generator having series and shunt field windings, a welding tool electrically associated with one of said windings, an automatic resistance varying device electrically associated with the other of said windings adapted to vary the potential of said generator means subject to the electro-magnetic influence of the current flowing through the welding tool to vary said automatic resistance, and means automatically introduced into the potential varying circuit to reduce the potential of the welding current adapted to be cut out of said circuit upon the starting of the welding arc.

Signed at New York in the county of New York and State of New York this 21st day of November A. D. 1913.

DAVID H. WILSON.

Witnesses:
MYRON F. HILL,
A. L. TRAVIS.